No. 870,074. PATENTED NOV. 5, 1907.
J. ASTROM.
APPARATUS FOR THE PRODUCTION OF VIBRATIONS.
APPLICATION FILED FEB. 2, 1905. RENEWED JAN. 21, 1907.

Witnesses:
Fred Palm
George Felter

Inventor:
John Astrom
By Oliphant & Young
Attorneys

UNITED STATES PATENT OFFICE.

JOHN ASTROM, OF MILWAUKEE, WISCONSIN.

APPARATUS FOR THE PRODUCTION OF VIBRATIONS.

No. 870,074.   Specification of Letters Patent.   Patented Nov. 5, 1907.

Application filed February 2, 1905. Serial No. 243,912. Renewed January 21, 1907. Serial No. 353,355.

*To all whom it may concern:*

Be it known that I, JOHN ASTROM, a citizen of the United States, and a resident of Milwaukee, in the county of Milwaukee and State of Wisconsin, have invented certain new and useful Improvements in Apparatus for the Production of Vibrations; and I do hereby declare that the following is a full, clear, and exact description thereof.

My invention has reference to apparatus designed to produce vibrations, caused by the interrupted current of a fluid under pressure passing therethrough and is particularly designed to create sound, and it consists in certain peculiarities of construction and combination of parts, as will be hereinafter fully described, in connection with the accompanying drawings and subsequently claimed.

Figure 1:
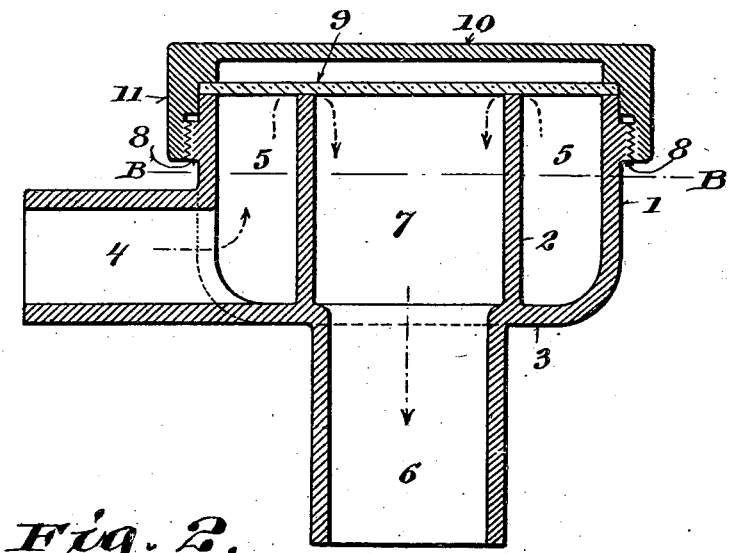
Figure 2:
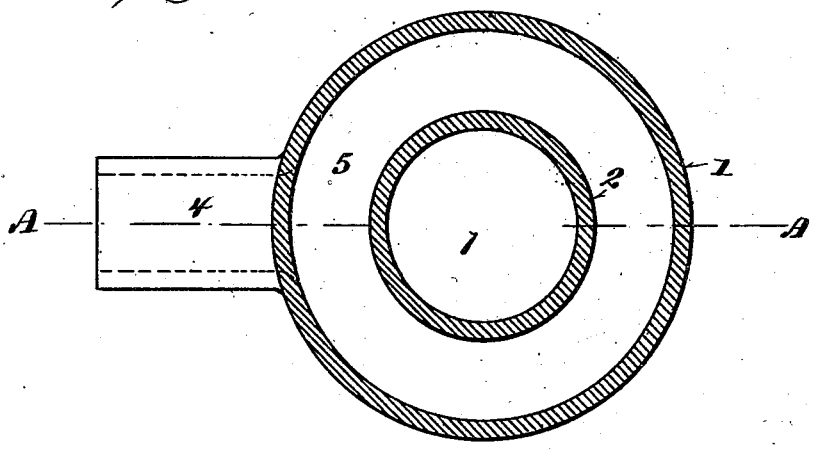

In the said drawings: Figure 1 is a sectional elevation of one form of a device embodying my said invention, the plane of the section being indicated by line A—A of Fig. 2. Fig. 2, is a horizontal sectional view thereof, taken on the plane indicated by the line B—B of Fig. 1.

Referring by numerals to said drawings, 1 represents an outer vessel and 2 an inner vessel, connected together at the base 3, and arranged concentrically one within the other, said vessels being open at the top, and there being, in the arrangement shown in the said drawings, a pipe or passage-way 4, leading into the space 5 between the inner surface of the outer vessel 1 and the outer surface of the inner vessel 2, the said vessels being herein illustrated as cylindrical in form, and the said space 5 being therefore annular, though this is not material, the said pipe 4 entering said space 5 at the lower end thereof. In this arrangement there is also a pipe or passage-way 6 leading from the base 3, and open to central space 7, within the inner vessel 2, but of less diameter than the said vessel. The upper ends of the said vessels 1 and 2 rise to practically the same height, and below said upper end the vessel 1 is formed with an exterior screw-threaded flange 8.

Over the upper ends of the vessels 1 and 2 there is superimposed a diaphragm 9 of suitable material and elasticity, which diaphragm is held taut against the upper edge of the vessel 1 by means of a countersunk cap 10 having an exteriorly screw-threaded rim 11 engaging the flange aforesaid.

In the operation of my device, as indicated by the arrows, the pipe or passage-way 4 is to be regarded as the inlet for the fluid employed, and the pipe or passage-way 6 as the outlet therefor, although this may be reversed, as hereinafter explained, and the fluid employed may be gaseous fluid such as air or steam, or it may be liquid such as water, as preferred in any given case, but in the present illustration let it be assumed that a gaseous fluid is employed entering through pipe or passage-way 4, and discharging at 6, as stated. The diaphragm 9 which is clamped to the upper edge of the outer vessel 1, rests loosely on the upper-edge of the inner vessel 2, and by means of this diaphragm the interior of the described apparatus is shut off from all communication with the surrounding medium, otherwise than through the passage-way 6. The space 5 between the vesesls 1 and 2, and the space 7 inside of the vessel 2, are separated from each other when the diaphragm 9 is in contact with the upper edge of the vessel 2, and have a communication when the said diaphragm is lifted from such contact, as hereinafter described. If the fluid or gaseous substance is forced into the space 5, through the pipe or passage-way 4 under pressure, the diaphragm 9 will be thereby forced away from contact with the upper edge of the vessel 2 (or if not in absolute contact, the opening between the diaphragm and the inner vessel edge will be increased) and the fluid will escape into the central space 7, where it will flow in the direction of the arrows, and pass out through the pipe or passage-way 6. In so doing, if the liquid is gaseous, it will expand in the space 7 and have increase of velocity through the outlet 6, thus creating a vacuum, or partial vacuum, in said space 7, the result of which is that the diaphragm 9 will draw back to, or towards, the upper edge of the vessel 2, (this being aided by the simultaneous slight momentary reduction of pressure in the upper end of the space 5, occasioned by the inflow of the fluid into the space 7,) and thereby the flow of more of the fluid from the space 5 into the space 7 is arrested or decreased, until the pressure in the space 5 has again increased enough to move the diaphragm 9 away from the upper edge of the vessel 2, when the above described action will be repeated. If the fluid forced into the space 5, through the inlet 4, is a liquid such as water, the inertia due to the speed with which said liquid traverses the said space 7 towards the outlet 6, will in the same manner, create a total or partial vacuum in said space 7, and allow the diaphragm 9 to be drawn against or towards the upper edge of the vessel 2, as before described. It will thus be observed that the said diaphragm 9 will be maintained in a continuous vibration so long as a continuous supply of the fluid employed is being forced into the apparatus through the inlet 4 and allowed to escape therefrom through the space 7 and outlet 6, which vibration is transmitted to the medium surrounding the apparatus. As hereinbefore stated, the part 6 can be arranged to serve as the inlet, and the apparatus made to discharge through the part 4, the difference of pressure in either instance within the parts 4 and 6 being the cause of the vibrations of the diaphragm 9, and the consequent variable pressure in the spaces 5 and 7, resulting in the production of sound, the volume and height of which depend both upon the pressure employed, and upon the general and detail design of the apparatus. In the operation of my device it is immaterial whether the medium which surrounds the same is gaseous or liquid, as for example, either air or water, or partly one form of fluid and partly the other, and hence the said operation is independent of location or environment, or the particular nature of the fluid under pressure employed.

While, as stated, my device is particularly intended for the production of sound, such as audible signals, it is adapted for use in any other relation where the production and transmission of vibrations is essential.

I claim:

1. An apparatus comprising a pair of vessels open at one end, and arranged one within the other, one vessel having an inlet and the other an outlet, which communicate, one with the space between the two vessels, and the other with the space inside the inner vessel; in combination with a movable closure for the open ends of said vessels, whereby the said device may be put into vibration by the passage therethrough of an interrupted current of fluid under pressure.

2. In an apparatus for the production of vibrations, the combination with two vessels, arranged one within the other with a space within the inner vessel, and another space between the two vessels, the latter being open at one end and one of said vessels having an inlet for the admission of fluid under pressure, and the other an outlet for said fluid, of a movable closure for the open ends of said vessels, said closure being adapted to be moved by said fluid to enable the fluid to flow from one to the other of said spaces, and then to be instantly closed, the difference in pressure between the inlet and outlet causing the said vibrations in the operation of the device.

3. An apparatus for the production of vibrations, consisting of two vessels arranged one within the other, and open at one end, the said vessels there terminating on practically the same plane, and one vessel having an inlet and the other an outlet, in combination with a movable diaphragm secured against the open-end edge of the outer vessel and resting loosely against the corresponding edge of the inner vessel, the said inlet being for the admission of fluid under pressure.

In testimony that I claim the foregoing I have hereunto set my hand at Milwaukee in the county of Milwaukee and State of Wisconsin in the presence of two witnesses.

JOHN ASTROM.

Witnesses:
H. G. UNDERWOOD,
GEORGE FELBER.